United States Patent [19]

Bishop

[11] Patent Number: 5,302,058

[45] Date of Patent: Apr. 12, 1994

[54] WORKPIECE SUPPORT DEVICE

[76] Inventor: David H. Bishop, P.O. Box 590, Leesburg, Ga. 31763

[21] Appl. No.: 80,297

[22] Filed: Jun. 21, 1993

[51] Int. Cl.⁵ .................... B23B 49/02; B23B 47/28
[52] U.S. Cl. ............................... 408/115 R; 408/104
[58] Field of Search .............. 408/72 R, 72 B, 97, 408/99, 100, 104-106, 115 R, 115 B, 108-110

[56] References Cited

U.S. PATENT DOCUMENTS

| | | | |
|---|---|---|---|
| 579,037 | 3/1897 | Bullock et al. | |
| 673,689 | 5/1901 | Reil | 408/104 |
| 787,893 | 4/1905 | Christoph | |
| 817,513 | 4/1906 | Parker | |
| 917,152 | 4/1909 | Richards | 408/106 |
| 2,455,024 | 11/1948 | Schneider | 77/62 |
| 2,932,995 | 4/1960 | Durfee | 77/62 |
| 3,297,314 | 1/1967 | Brown | 269/243 |
| 3,345,061 | 10/1967 | Schaefer | 269/246 |
| 3,762,829 | 10/1973 | Yilmaz | 408/105 |
| 4,583,432 | 4/1986 | Bricker | 82/1 C |
| 4,621,821 | 11/1986 | Schneider | 279/83 |

Primary Examiner—Steven C. Bishop
Attorney, Agent, or Firm—Needle & Rosenberg

[57] ABSTRACT

A device for supporting a workpiece in which an eccentric hole is to be drilled parallel to the workpiece's longitudinal axis is disclosed. The device has a base having a forward end, a rearward end, a top surface, and a bottom surface. Prior to drilling, the workpiece is secured in an upstanding retainer attached to or integral to the top surface of the forward end of the base. The retainer has a rectangular block body with a cavity into which one end of the workpiece is secured. The other end of the workpiece is similarly secured in an upstanding retainer on the top surface of the other end of the base. The distance between the retainers is adjustable. The height of the workpiece may be adjusted within each retainer by shims. Drill guides are provided at both retainers. The drill guides are aligned to permit the drilling of an eccentric longitudinal hole through the workpiece.

10 Claims, 2 Drawing Sheets

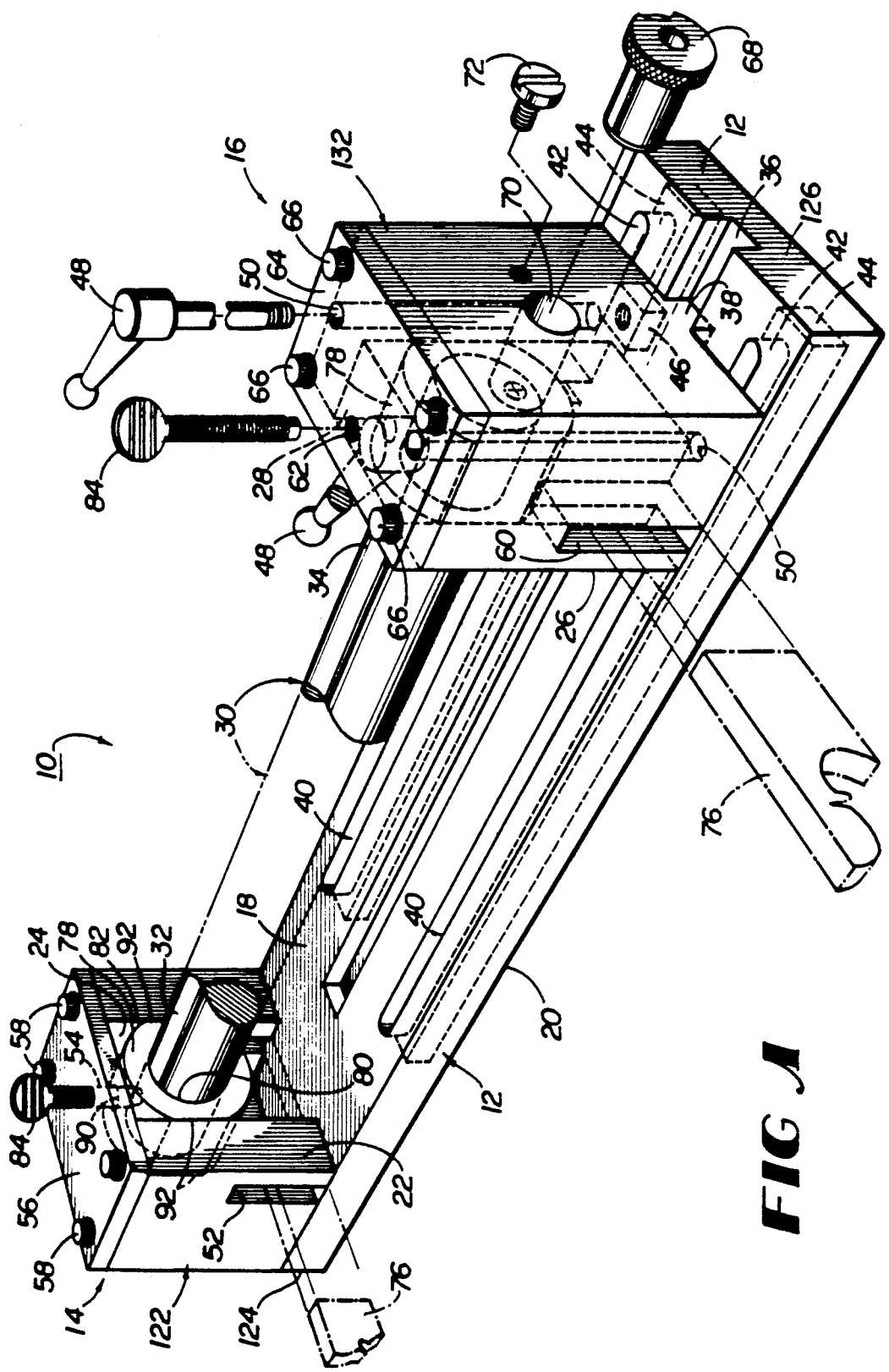

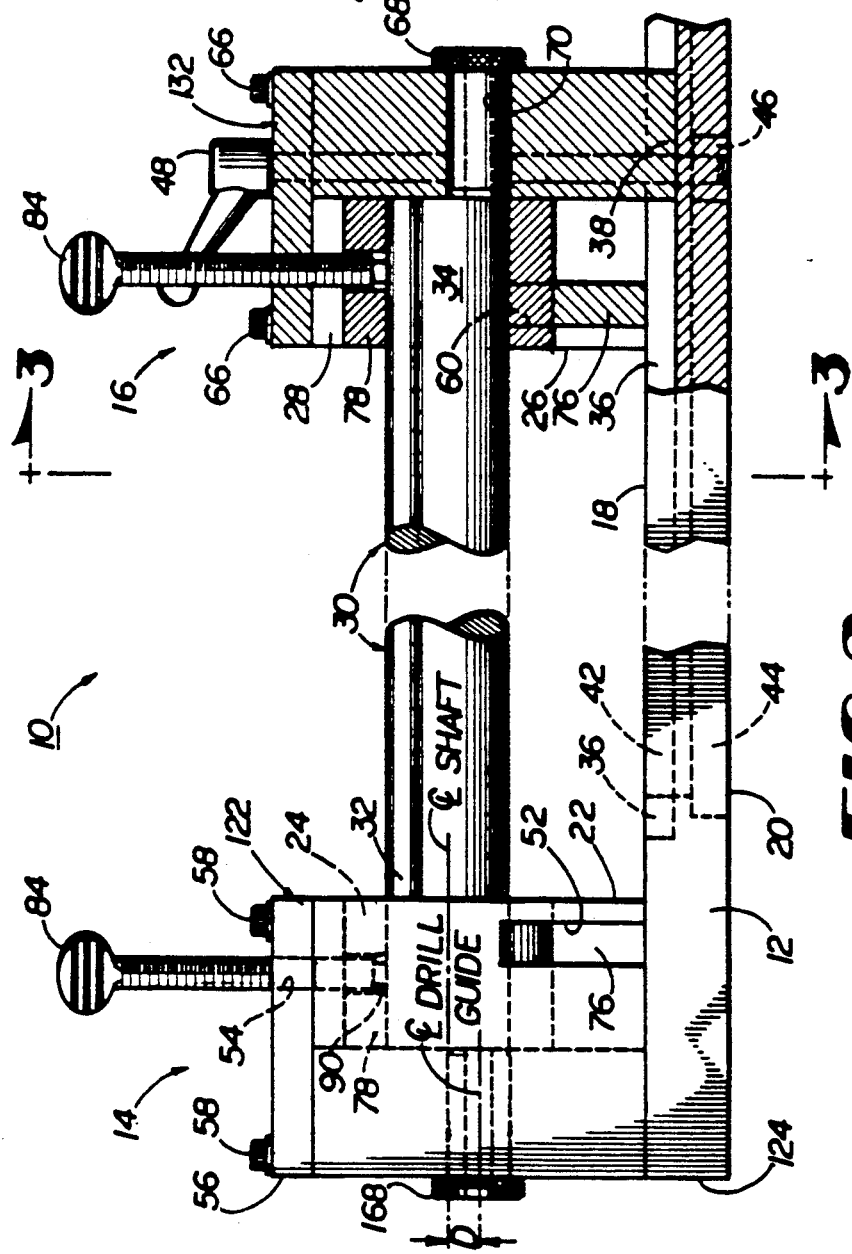

WORKPIECE SUPPORT DEVICE

FIELD OF THE INVENTION

The present invention is related to the field of machine tooling for holding a workpiece, and more particularly to a device for supporting a workpiece in which an eccentric hole is to be drilled.

BACKGROUND OF THE INVENTION

In the past, when it was desired to make an eccentric shaft parallel to a longitudinal axis of a workpiece, the workpiece would typically be clamped in a vise or onto a rotary table, and, by using a horizontal head, indicate each end of the shaft and step off the required off-center distance of the shaft with a milling machine. This technique required an experienced machinist and a considerable amount of time to set up.

An object of this invention is therefore to provide a device for supporting a workpiece into which an eccentric shaft is to be drilled that is simple to set up.

It is further an object of this invention to provide such a device for supporting a workpiece that does not require a milling machine.

SUMMARY OF THE INVENTION

In order to meet these and other objects, the invention provides a novel apparatus for supporting a workpiece in which an eccentric hole is to be drilled, comprising a base member, a pair of receiving means having cavities for receiving the ends of a workpiece, a pair of workpiece receiving means for adjustably securing the respective ends of the workpiece within cavities at a selected height above the base, and position adjustment means for adjusting the distance between the receiving means to accommodate the workpiece. The receiving means also have drill guides suitably aligned with one another for guiding the drill into and out of the workpiece. Each of the workpiece securing means may comprise a bushing which fits into or is held in the cavity of one of the receiving means, and a shim may be used to support the bushing at a selected height above the base member.

Although the overall shape of the base is not critical, it is convenient for the base to be generally flat and rectangular, with the longitudinal axis of the base parallel to the longitudinal axis of the workpiece when the workpiece is held by the device. The receiving means may be block-like structures with cavities held on top of the base at opposite longitudinal ends of the base, with the cavities facing one another to adjust the distance between the receiving means to accommodate different size workpieces. The position of at least one of the receiving means on the base is adjustable.

BRIEF DESCRIPTION OF THE FIGURES

FIG. 1 is a partially exploded perspective view of the preferred embodiment in accord with the present invention.

FIG. 2 is a longitudinal section view of the preferred embodiment Along the line x—x in FIG. 1.

FIG. 3 is a cross-section view of the adjustable end block assembly along line 3—3 in FIG. 2.

DETAILED DESCRIPTION 07 THE PREFERRED EMBODIMENT

Referring to FIG. 1, a device 10 for supporting a workpiece in which an eccentric hole is to be drilled is shown. The device 10 comprises a base member 12 with an upstanding forward end 14 for receiving a first end 32 of a workpiece 30, an opposing upstanding rearward end 16 for receiving a second end 34 of the workpiece 30, a top surface 18, and an opposing bottom surface 20. The forward end 14 has a first face 22 with a first cavity 24 therein into which the first end 32 of the workpiece 30 is received. The rearward end 16 has a second face 26 in opposed relationship to the first face 22 with a second cavity 28 therein into which the second end 34 of the workpiece 30 is received. Means are provided on the upstanding forward end 14 and upstanding rearward end 16 for adjustably securing the first and second ends 32, 34 of the workpiece 30 within the first and second cavities 24, 28 at a selected height above the base member 12. The present device 10 also includes means for adjusting the distance between the upstanding forward end 14 and the upstanding rearward end 16 to accommodate the workpiece 30.

The base member 12 also comprises a groove 36 for receiving a tongue 38 that extends downward from the upstanding rearward end 16. This groove 36 helps to keep the rearward end 16 properly aligned in the device 10 as the distance between the ends 14, 16 is adjusted to accommodate workpieces 30 of different lengths. The groove 36 extends longitudinally through the base member 12 and can extend the entire length of the base member or, as shown in FIG. 1, some selected portion thereof. Although in the preferred embodiment, tongue 38 extends downward from rearward end 16, embodiments are also possible in which a tongue extends instead from forward end 14 or from both forward and rearward ends 14, 16 into groove 36.

The base member 12 also includes two longitudinally extending parallel conduits 40, each of which passes through the top surface 18 and bottom surface 20 of the base member 12 and extends between the upstanding forward end 14 and the upstanding rearward end 16. Each conduit 40 has the cross-sectional shape of an inverted "T" with the vertically disposed lower portion forming a bolt channel 42 that opens through the top surface 18. The laterally disposed lower portion of the conduit 40 forms a nut channel 44 that opens through the bottom surface 20 and is capable of receiving a nut 46 therein. The nut channel 44 and the bolt channel 42 are aligned and in communication with each other to permit a bolt 48 to pass through the bolt channel 42 into the nut channel 44 where it can be fastened to a nut 46.

The upstanding forward end 14 comprises a body 122, a first cavity 24 in the body 122 for receiving the workpiece 30, a shim slot 52-through the body 122 disposed horizontally perpendicular to the length of the base member 12 and opening into the cavity 24, and a threaded hole 54 in the top of the forward end 14 through which a threaded thumbscrew 84 will pass. In operation, the first end 32 of the workpiece 30, having been inserted into an appropriate bushing 78, will be put into the cavity 24 in the forward end 14, a shim 76 will be inserted through the shim slot 52 under the bushing 78 attached to the workpiece 30, and the workpiece 30 will be secured by the thumbscrew 84, which passes through a hole 90 in bushing 78, which has flats 92 on each side for increased wear area.

Like the upstanding forward end 14, the upstanding rearward end 16 comprises a body 132, the body having a second face 26 in opposed relationship to the first face 22, a second cavity 28 in body 132 for receiving the second end 34 of the workpiece, a shim slot 60 through the rearward end 16 disposed horizontally perpendicular to the length of the base member 12 and opening into the cavity 28, and a threaded hole 62 in the top of the rearward end 16 through which a threaded thumbscrew 84 will pass. Installation of the second end 34 of the workpiece 30 in the upstanding rearward end 16 proceeds largely as the installation of the first end 32 of the workpiece 30 did in the upstanding forward end 14. FIG. 3 shows the second end 34 of the workpiece inserted in bushing 78 supported by shim 76 and secured by thumb screw 84.

Returning to FIG. 1, the upstanding rearward end 16 further comprises a drill guide 68 and a hole 70 through which the drill guide will pass. The upstanding rearward end 16 should be oriented on the base member 12 so that the cavity 28 faces the forward end 124 of the base member 12. Although not visible in FIG. 1, the upstanding forward end 14 similarly comprises a drill guide 168 and a hole 170 through which drill guide 168 will pass. Drill guide 168 and hole 170 are shown in FIG. 2, and are aligned with drill guide 68 and hole 70 in the upstanding rearward end 16. Each of the drill guides 68 and 168 can be secured to then respective ends 14, 16 by means of a screw or bolt 72, as shown in FIG. 1, or by other effective means.

As further seen in FIG. 1, the upstanding rearward end 16 additionally comprises two threaded securement bolts 48, each of which passes through a vertical unthreaded bore 50, and also comprises a tongue 38 extending downward from the bottom surface of the rearward end 16 and running from the front of the rearward end 16 to the back. The securement bolts 48 are for adjustably securing the upstanding rearward end 16 to the base member 12. They will be aligned with the two conduits 40 in the base member 12. The tongue 38 will guide the end block 16 as the distance between the forward and rearward upstanding ends 14, 16 is adjusted. A bolt 48 will be inserted into each of the two unthreaded bores 50 in the upstanding rearward end 16. Each of these bolts 48 will pass through the bolt channel 42 in the base member 12 and will threadingly secure a nut 46 sitting in the nut channel 44 below the base member 12.

The means for securing the workpiece 30 in the end blocks 14, 16 comprises primarily a pair of bushings 78, a pair of shims 76, and a pair of thumbscrews 84. Each bushing 78 comprises an opening 80 into which a workpiece can securely be engaged, and an exterior surface 82 capable of fitting within either the forward or rearward upstanding end cavity 24, 28 while unable to shift position within that cavity 24, 28. Furthermore, to accommodate workpieces of varying shapes or diameters, the dimensions of the bushing opening 80 should be variable, either by mechanical means in the bushing 78, or by having a collection of bushing pairs 78 of varying internal dimensions. It is expected that the most common workpiece 30 will be cylindrical; because of this, the normal set of bushings 78 will comprise several pairs of bushings 78 wherein each pair has an opening 80 that has an incrementally larger diameter than the previous pair of bushings 78. Nonetheless, the present invention contemplates workpieces 30 of noncylindrical shape, and thus contemplates bushings 78 crafted to accommodate such workpieces 30.

Each shim 76 is sufficiently long and appropriately shaped that it is capable of being inserted completely through the shim slots 52, 60 in either of the forward or rearward upstanding ends 14, 16. Furthermore, the shims must be made of a material that makes them capable of supporting the workpiece 30 in the cavity 24, 28. To support the workpiece 30 at the proper height relative to the base member 12, a collection of shims 76 having varying dimensions should be maintained.

The preferred means for adjusting the distance between the end blocks 14, 16 comprises the two parallel conduits 40 in the base member 12, a nut 46 that will slidingly fit into the nut channel 44, the securement bolts 48, the groove 36 cut in the top surface 18 of the base member 12, and the tongue 38 on the bottom of the upstanding rearward end body 26. The conduits 40 must be wide enough to allow the securement bolts 48 and slide nuts 46 to slide along the length of the base member 12 in the conduits 40 particularly while the bolts 48 are fastened to the nuts 46. The groove 36 will be shaped to receive therein the tongue 38 and to permit the tongue 38 to slide along the length of the base member 12. Also, as shown in FIGS. 1 and 2, the groove 36 will usually be slightly longer than the conduits 40, but can be shaped as needed to accommodate the characteristics of the upstanding rearward end 16.

Into the back side of each end block 14, 16, a drill guide 68 will pass through a hole 70 in the end block body 22, 26, and will be secured by a bolt 72. The drill guide holes 70 should be oriented so that a drill (not shown), penetrating the drill guide 168 in the upstanding rearward end 16 will also pass through the drill guide 68 in the upstanding forward end 14, and viceversa. A bolt 72 is the preferred means for affixing each drill guide 68, 168 to the end block 14, 16.

What is claimed is:

1. A device for supporting a workpiece in which an eccentric hole is to be drilled, the device co rising:
   (a) a base member having a top surface and an opposing bottom surface;
   (b) a first receiving means for receiving a first end of the workpiece disposed on the top surface of the base member and having a first face with a first cavity therein for receiving the first end of the workpiece and also having a first drill guiding means for passing a drill longitudinally through the workpiece;
   (c) a second receiving means for receiving a second end of the workpiece disposed on the top surface of the base member and having a second face with a second cavity therein for receiving the second end of the workpiece and also having a second drill guiding means for passing a drill longitudinally through the workpiece;
   (d) workpiece securing means on each of the first and second receiving means for adjustably securing the respective ends of the workpiece within the respective cavities at a selected height above the base; and
   (e) a distance adjustment means for adjustably securing at least one of the receiving means to the base member at a selected distance from the other receiving means whereby the first face and second face are in opposed relationship with one another and the first and second drill guides are aligned so that a drill penetrating one of the drill guides will also pass through the other drill guide, thereby drilling an eccentric hole parallel to the longitudinal axis of the workpiece.

2. The device of claim 1, wherein each workpiece securing means comprises a bushing capable of securely receiving therein the respective end of the workpiece, wherein the bushing fits within the respective cavity.

3. The device of claim 2 wherein each workpiece securing means further comprises a holding means for holding the bushing in the respective cavity.

4. The device of claim 2 wherein each workpiece securing means further comprises a shim capable of supporting the respective bushing at a selected height above the base member.

5. The device of claim 4, wherein the shim is received in a slot, laterally extending through the respective receiving means and opening into the respective cavity and dimensioned to receive a shim.

6. The device of claim 3, wherein each workpiece securing means comprises a thumbscrew that extends into the respective cavity to engage the bushing therein.

7. The device of claim 1, wherein at least one of the receiving means comprises a tongue matably and slidably engaged with a groove in the top of the base member.

8. The device of claim 7, wherein a portion of the distance adjustment means is secured within a conduit parallel to the groove and passing through the top and bottom surfaces of the base member.

9. The device of claim 8 wherein the distance adjustment means comprises a bolt that can extend through an unthreaded bore in one of the receiving means wherein the bore is perpendicular to the top surface of the base member and aligned with the conduit wherein the bolt may be secured.

10. The device of claim 9 wherein the distance adjustment means further comprises a nut, and the conduit comprises a bolt channel in the top surface of the base member and a nut channel in the bottom surface of the base member, the bolt channel and nut channels being aligned to permit the bolt to pass through the bolt channel into the nut channel and the bolt to receive the nut thereon in the nut channel.

* * * * *